Dec. 21, 1954 J. K. MILLS 2,697,792
HOWLER TONE CIRCUIT INVOLVING A MOTOR-DRIVEN INTERRUPTER
Filed Sept. 11, 1952
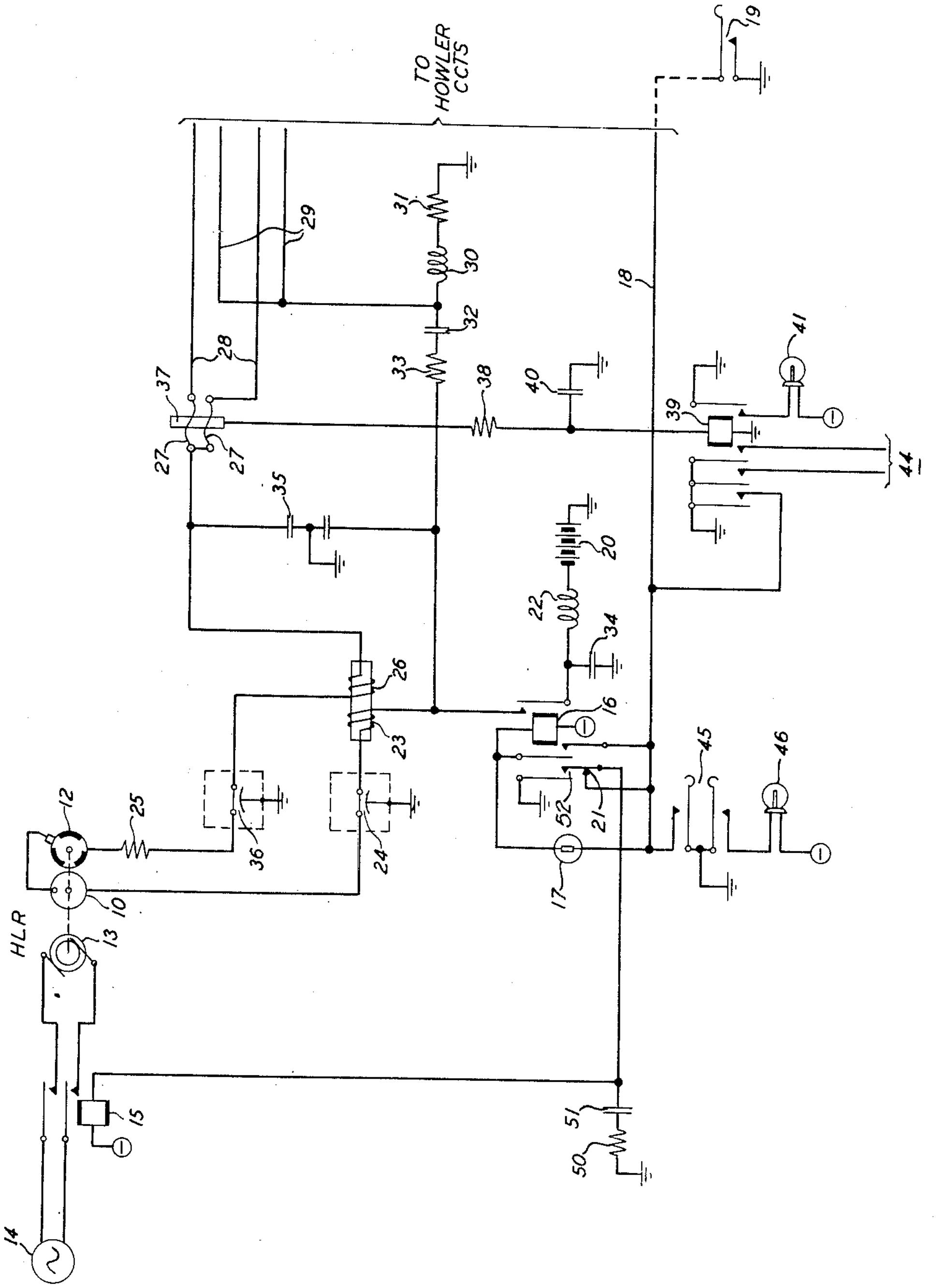
INVENTOR
J. K. MILLS
BY G. F. Kane
ATTORNEY

United States Patent Office 2,697,792

Patented Dec. 21, 1954

2,697,792

HOWLER TONE CIRCUIT INVOLVING A MOTOR-DRIVEN INTERRUPTER

John K. Mills, Morristown, N. J., assignor to Bell Telephone Laboratories, Incorporated, New York, N. Y., a corporation of New York Application September 11, 1952, Serial No. 309,003

5 Claims. (Cl. 307—132)

This invention relates to tone supply circuits as employed in the telephone plant and more particularly to howler tone supply circuits which furnish howler tone for signaling telephone subscribers at whose stations the telephone handset or receiver has not been replaced on its support or is otherwise improperly seated thereon.

It has been determined that telephone subscribers, through inadvertence, frequently leave their telephones in a condition in which the handset or receiver is improperly restored to its support or is not restored thereto at all. This undesirable condition, which manifests itself in a permanent signal at the central office switchboard is usually corrected by the application of howler tone to the line on which the unstandard condition exists. This tone is applied to the line at the central office and cause an audible signal of attention-arresting character to be produced at the subscriber's station. If available, the subscriber upon hearing such signal will, upon investigation, restore the telephone to its support.

The howler tone is generally supplied by a commutator type motor-driven howler interrupter which functions to apply interrupted battery to the howler connecting circuits at a relatively high rate and usually at about 460 pulses per second. It has been discovered that sparking at the commutator contacts of such interrupters manifests itself during intervals when the interrupter is accelerating and decelerating. Since such arcing is not only objectionable from the viewpoint of damage to the interrupter itself but also from the viewpoint of interference to neighboring equipment and circuits, its elimination is a necessary requirement in the design of such tone supply circuits.

It is the object of this invention to eliminate sparking from telephone howler tone supply circuits of the type in which the tone current is supplied from a central office battery through the medium of a motor-driven interrupter.

This object is attained in accordance with a feature of the invention by means of a novel type of control circuit which insures the driving motor attaining full rotational speed before the battery is connected to the interrupter commutator, and similarly insures the disconnection of the battery from the interrupter commutator before the motor-operating circuit is opened at the conclusion of a tone-transmitting period. More particularly, the control circuit of this invention includes a motor start relay and a parallelly connected battery-connecting relay, the circuit to the latter including a time delay device which insures delaying the connection of battery to the interrupter until a predetermined interval of time after the motor start circuit is completed. When the battery-connecting relay operates, it assumes control of the motor start relay so as to insure a reverse sequence in the release of the two relays and thereby insures disconnection of battery from the interrupter before the motor circuit is opened.

This and other features of the invention will be readily understood from the following detailed description when read with reference to the accompanying drawing, the single figure of which is a diagrammatic illustration of a howler tone supply circuit embodying the features of the invention.

Howler tone is produced by the motor-driven howler interrupter HLR which includes a common slip ring 10 and commutator 12 which, as schematically indicated, are mechanically coupled to the driving motor 13 which, in turn, is connectable to the alternating-current source 14 by way of the armature contacts of relay 15 which relay, for descriptive purpose is herein characterized as the motor start relay.

The winding of motor start relay 15 is connected in parallel with the winding of battery-connecting relay 16 and its associated thermistor 17 to a start conductor 18 which terminates at the central office switchboard (not shown) in a manually operable switch or key 19.

The battery employed with the interrupter HLR in supplying howler tone is shown at 20. The remaining elements of the drawing which are thus far not identified will be described in detail hereinafter as the following description of the operation of the circuit progresses.

When the key 19 at the central office switchboard is actuated to closed position ground potential is applied to the start conductor 18 whereupon motor start relay 15 operates immediately in a circuit which includes the armature contact 21 of relay 16. Thus, immediately upon the application of ground to the start lead 18 and the consequent operation of relay 15 the motor 13 is energized and the interrupter HLR is caused to rotate. Within a predetermined period of time the motor and therefore the interrupter are operating at full speed.

Ground potential on start conductor 18 also traverses a path which includes the negative temperature coefficient device or thermistor 17 and the winding of battery-connecting relay 16 and battery. After a short delay of about two seconds, which is adequate time for the motor 13 to reach full speed the resistance of thermistor 17 is reduced sufficiently to permit relay 16 to operate in the circuit just described. At its inner left armature and front contact relay 16 locks to ground on start lead 18. At its outer left armature and front contact 52 relay 16 connects direct ground to the winding of relay 15 to maintain this relay operated under control of relay 16 inasmuch as contact 21 breaks after contact 52 is made. The inner left armature of relay 16 also short-circuits the thermistor 17 permitting it to cool off. At its right armature and front contact relay 16 connects battery 20 through filter coils 22 and 23 and condenser 24 to the common slip ring 10 of the interrupter HLR.

Thus it is apparent that the connection of battery to the interrupter does not take place during the acceleration period of the interrupter but only after the interrupter has attained full speed.

Interrupted battery at about 460 pulses per second from the commutator 12 of interrupter HLR is fed through resistor 25, condenser 36, coil 26 and fuses 27 to the common connecting circuit by way of leads such as 28. The showing of but one brush on the commutator and two such leads is illustrative only, it being understood that the capacity of this circuit is much greater.

Each lead 28 to the connecting circuit is paired with a lead 29 which is connected to ground through filter coil 30 and resistor 31. The leads 29 are also connected to filtered battery through a network consisting of capacitor 32 in series with resistor 33 when relay 16 is operated.

The filter consisting of coil 22 and capacitor 34 prevents tone from being introduced into the central office battery. Also a radio frequency interference filter consists of coil 26 and capacitor 35, and a very high frequency interference filter consisting of resistor 25 and a feed-through capacitor 36 is connected in series with the interrupter brush.

The network consisting of resistance 50 and condenser 51 serves to protect the constacts 21 of relay 16 and the contacts of key 19.

The fuse alarm studs, such as 37, are connected through resistor 38 to the winding of relay 39 in parallel with capacitor 40. If a fuse blows while the interrupter is running, the interrupted battery will operate relay 39 causing the lighting of lamp 41. Also relay 39 applies a holding ground to lead 18 to keep the interrupter running and to thus maintain relay 39 operated to lock in the alarm circuit 44 with which there may be associated the usual audible and visual alarms.

The capacitor 40 serves also to prevent relay 39 from buzzing due to its interrupted battery supply.

When ground is removed from conductor 18, relay 16 releases immediately to effect the immediate disconnection of battery 20 from the interrupter HLR. Relay 16, released opens the locking or holding circuit to relay 15 causing this relay to release and to open the energizing circuit for motor 13. The motor thereupon decelerates and eventually stops. By transferring the control of relay 15 from the start lead 18 to relay 16 when the latter operates, the disconnection of battery 20 from the interrupter HLR before the motor starts to decelerate is assured.

With the circuit of this invention, relays 15 and 16 are caused to operate in a definite order and to release in the reverse order thereby insuring the connection of battery to the interrupter only after the interrupter has come up to full speed and its disconnection therefrom before the interrupter starts to decelerate. Thus sparking, which heretofore had been in evidence during the accelerating and decelerating periods of the interrupter, is eliminated.

A manual start key 45 is provided for maintenance purposes. This key, when operated, places ground potential on start lead 18 and operates guard lamp 46.

What is claimed is:

1. A control circuit for a motor-driven interrupter comprising, in combination with a battery, a source of power, an interrupter, a motor for driving said interrupter, a first relay, a second relay, an energizing circuit for said second relay including a source of current, a winding of said second relay and a serially connected resistor having a negative temperature coefficient of resistance, an energizing circuit for said first relay including a source of current, a winding of said first relay and normally closed contacts of said second relay, means for simultaneously energizing said circuits whereby said first relay operates in advance of said second relay, means controlled by said second relay to establish a holding circuit for said first relay and to connect said battery to said interrupter, means controlled by said second relay to open the said normally closed contacts thereof, means controlled bv said second relay and means controlled by said first relay, when operated, for connecting said motor to said source of power.

2. A control circuit for a motor-driven interrupter comprising, in combination with a battery, a source of power, an interrupter, a start lead, a motor for driving said interrupter, a first relay, a second relay, an energizing circuit for said second relay including a source of current, a winding of said second relay, a serially connected resistor having a negative temperature coefficient and said start lead, an energizing circuit for said first relay including a source of current, a winding of said first relay, normally closed contacts of said second relay and said start lead, means for enabling said start lead to energize said circuits whereby said first and second relays operate in a particular order in a definite sequence, means controlled by said first relay for connecting said motor to said source of power, and means controlled by said second relay for connecting said battery to said interrupter, means for disabling said start lead, means controlled by said second relay for insuring the release of said first and second relays, when said start lead is disabled, in an order reverse to that in which said relays operated.

3. The combination of an interrupter, a motor for driving said interrupter, a source of current for operating said motor, a battery, and a circuit for controlling the connection of said battery to said interrupter and of said motor to said source of current comprising a relay for connecting said motor to said source of current, a slow-operating relay for connecting said battery to said interrupter, means for effecting simultaneous closure of energizing circuits to said relays, and means controlled by said slow-operating relay for controlling the release of said first relay.

4. The combination of an interrupter, a motor for driving said interrupter, a source of current for operating said motor, a battery, and a circuit for controlling the connection and disconnection of said battery to and from said interrupter and of said motor to and from said source of current comprising a relay for connecting and disconnecting said motor to and from said source of current, a relay comprising a core having windings thereon for connecting and disconnecting said battery to and from said interrupter, a time delay device included in series with the winding of said second relay, means for effecting the simultaneous energizing of said circuit comprising said relays, and means controlled by said second relay for rendering the release of said first relay dependent upon the release of said second relay.

5. A control circuit for a motor-driven interrupter comprising, in combination with a battery, an interrupter, a motor coupled to said interrupter, a source of power, means including a first relay for connecting said motor to said source of power, means including a second relay for connecting said battery to said interrupter, a common switching means for initiating the operation of said relays, means included in the circuit of said second relay for delaying the operation of said second relay, incident to the operation of said common switching means, for a predetermined period of time following the operation of said first relay, and means including contacts controlled by said second relay for rendering the release of said first relay subject to the release of said second relay whereby said battery is disconnected from said interrupter before said motor is disconnected from said source of power incident to the release of said common switching means.

References Cited in the file of this patent

FOREIGN PATENTS

| Number | Country | Date |
|---|---|---|
| 237,494 | Switzerland | Sept. 1, 1945 |

OTHER REFERENCES

"Relay Engineering," Struthers, Dunn Inc., 1st Ed. 1945 pp. 316–319.